United States Patent
Omoda et al.

(10) Patent No.: US 10,050,265 B2
(45) Date of Patent: Aug. 14, 2018

(54) POSITIVE ELECTRODE HAVING SULFUR CONTAINED IN PORES BETWEEN NANOCARBON STRUCTURES, ALKALI METAL-SULFUR BATTERY INCLUDING THE SAME, AND METHOD OF PREPARING THE POSITIVE ELECTRODE

(71) Applicants: Samsung Electronics Co., Ltd., Suwon-si, Gyeonggi-do (KR); ULVAC, INC., Chigasaki, Kanagawa (JP)

(72) Inventors: Ryo Omoda, Yokohama (JP); Takanobu Yamada, Yokohama (JP); Haruhisa Nakano, Yokohama (JP); Hirohiko Murakami, Yokohama (JP); Naoki Tsukahara, Yokohama (JP); Tatsuhiro Nozue, Yokohama (JP); Yoshiaki Fukuda, Yokohama (JP); Yuichi Aihara, Yokohama (JP)

(73) Assignees: SAMSUNG ELECTRONICS CO., LTD., Gyeonggi-Do (KR); ULVAC, INC., Kanagawa (JP)

( * ) Notice: Subject to any disclaimer, the term of this patent is extended or adjusted under 35 U.S.C. 154(b) by 185 days.

(21) Appl. No.: 14/955,137

(22) Filed: Dec. 1, 2015

(65) Prior Publication Data

US 2016/0181600 A1 Jun. 23, 2016

(30) Foreign Application Priority Data

Dec. 18, 2014 (JP) .................................. 2014-256519
Jul. 15, 2015 (KR) ........................ 10-2015-0100516

(51) Int. Cl.
*H01M 4/04* (2006.01)
*H01M 4/13* (2010.01)
(Continued)

(52) U.S. Cl.
CPC ............ *H01M 4/38* (2013.01); *H01M 4/0416* (2013.01); *H01M 4/0471* (2013.01); *H01M 4/13* (2013.01);
(Continued)

(58) Field of Classification Search
CPC ........ H01M 4/38; H01M 4/622; H01M 4/0416; H01M 4/0471; H01M 4/13; H01M 4/139; H01M 4/625
(Continued)

(56) References Cited

U.S. PATENT DOCUMENTS 5,523,179 A 6/1996 Chu
5,532,077 A 7/1996 Chu
(Continued)

FOREIGN PATENT DOCUMENTS

CN 104183850 A * 12/2014
JP 1999227391 A 8/1999
(Continued)

OTHER PUBLICATIONS

Miyuki et al., Machine translation of JP 2010-153296 A, Jul. 2010 (Year: 2010).*
(Continued)

*Primary Examiner* — Sean P Cullen
(74) *Attorney, Agent, or Firm* — Cantor Colburn LLP

(57) ABSTRACT

A positive electrode for an alkali metal-sulfur battery, the positive electrode including: a porous conductive material layer including a plurality of nanocarbon structures of a conductive material, wherein the conductive material defines a plurality of pores between the plurality of nanocarbon structures of the conductive material; sulfur, which is contained in the plurality of pores of the porous conductive material layer; and a polymer film disposed directly on at least a portion of the porous conductive material layer.

18 Claims, 2 Drawing Sheets

(51) Int. Cl.
  *H01M 4/139* (2010.01)
  *H01M 4/38* (2006.01)
  *H01M 4/62* (2006.01)
  *H01M 10/052* (2010.01)

(52) U.S. Cl.
  CPC .......... *H01M 4/139* (2013.01); *H01M 4/622* (2013.01); *H01M 4/625* (2013.01); *H01M 10/052* (2013.01)

(58) Field of Classification Search
  USPC .................. 429/58, 212, 247; 427/80, 372.2
  See application file for complete search history.

(56) References Cited

U.S. PATENT DOCUMENTS

| | | |
|---|---|---|
| 5,686,201 A | 11/1997 | Chu |
| 5,789,108 A | 8/1998 | Chu |
| 5,882,812 A | 3/1999 | Visco et al. |
| 6,017,651 A | 1/2000 | Nimon et al. |
| 6,030,720 A | 2/2000 | Chu et al. |
| 6,358,643 B1 | 3/2002 | Katz et al. |
| 7,078,124 B2 | 7/2006 | Kim et al. |
| 7,316,868 B2 | 1/2008 | Gorkovenko |
| 7,354,680 B2 | 4/2008 | Mikhaylik |
| 7,553,590 B2 | 6/2009 | Mikhaylik |
| 7,785,730 B2 | 8/2010 | Affinito et al. |
| 7,842,421 B2 | 11/2010 | Mikhaylik |
| 8,173,302 B2 | 5/2012 | Stamm et al. |
| 8,338,034 B2 | 12/2012 | Affinito et al. |
| 8,647,769 B2 | 2/2014 | Kolosnitsyn et al. |
| 8,663,840 B2 | 3/2014 | Nazri et al. |
| 8,735,002 B2 | 5/2014 | Scordilis-Kelley et al. |
| 8,828,610 B2 | 9/2014 | Mikhaylik |
| 8,846,248 B2 | 9/2014 | Ryu et al. |
| 2004/0009396 A1* | 1/2004 | Kim .................. H01M 4/136 429/212 |
| 2004/0029014 A1* | 2/2004 | Hwang .................. H01M 4/04 429/246 |
| 2007/0072076 A1 | 3/2007 | Kolosnitsyn et al. |
| 2010/0239914 A1 | 9/2010 | Mikhaylik et al. |
| 2010/0291442 A1 | 11/2010 | Wang et al. |
| 2011/0006738 A1 | 1/2011 | Mikhaylik et al. |
| 2011/0052998 A1 | 3/2011 | Liang et al. |
| 2011/0076560 A1 | 3/2011 | Scordilis-Kelley et al. |
| 2011/0091773 A1 | 4/2011 | Wei |
| 2011/0256450 A1 | 10/2011 | Champbell et al. |
| 2011/0262807 A1 | 10/2011 | Boren et al. |
| 2011/0287305 A1 | 11/2011 | Scordilis-Kelley et al. |
| 2012/0070746 A1 | 3/2012 | Mikhaylik et al. |
| 2013/0065128 A1 | 3/2013 | Li et al. |
| 2013/0136968 A1 | 5/2013 | Glanz et al. |
| 2013/0181677 A1 | 7/2013 | Kourtakis et al. |
| 2013/0183550 A1 | 7/2013 | Kourtakis |
| 2013/0202961 A1 | 8/2013 | Hagen et al. |
| 2013/0209880 A1 | 8/2013 | Nozue et al. |
| 2013/0330619 A1 | 12/2013 | Archer et al. |
| 2014/0023936 A1 | 1/2014 | Belharouak et al. |
| 2014/0052322 A1 | 2/2014 | Takeshi |
| 2014/0120428 A1 | 5/2014 | Kolosnitsyn et al. |

FOREIGN PATENT DOCUMENTS

| | | |
|---|---|---|
| JP | 2010153296 A | 7/2010 |
| JP | 2012238448 A | 12/2012 |
| JP | 5358792 B2 | 9/2013 |
| JP | 2014017240 A | 1/2014 |
| KR | 100502357 B1 | 7/2005 |
| KR | 1020130056731 A | 5/2013 |
| WO | 2012070184 A1 | 5/2012 |
| WO | 2012153613 A1 | 11/2012 |
| WO | 2013126864 A1 | 8/2013 |
| WO | 2013191791 A1 | 12/2013 |

OTHER PUBLICATIONS

Zhong Yujuan, Machine Translation of CN 104183850 A, Dec. 2014 (Year: 2014).*

Dörfler et al., High capacity vertical aligned carbon nanotube/suflur composite cathodes for lithium-sulfur batteries, 2012, Chem. Commun., 48, 4097-4099 (Year: 2012).*

Bruckner et al., "Lithium-sulfur batteries: Influence of C-rate, amount of electrolyte and sulfur loading on cycle performance", Journal of Power Sources, vol. 268, 2014, pp. 82-87.

Diao et al., "Insights into Li—S Battery Cathode Capacity Fading Mechanisms: Irreversible Oxidation of Active Mass during Cycling", Journal of the Electrochemical Society, vol. 159(11), 2012, A1816-A1821.

* cited by examiner

POSITIVE ELECTRODE HAVING SULFUR CONTAINED IN PORES BETWEEN NANOCARBON STRUCTURES, ALKALI METAL-SULFUR BATTERY INCLUDING THE SAME, AND METHOD OF PREPARING THE POSITIVE ELECTRODE

CROSS-REFERENCE TO RELATED APPLICATION

This application claims priority to and the benefit of Japanese Patent Application No. 2014-0256519, filed on Dec. 18, 2014, in the Japanese Intellectual Property Office, and that of Korean Patent Application No. 10-2015-100516, filed on Jul. 15, 2015, in the Korean Intellectual Property Office, and all the benefits accruing therefrom under 35 U.S.C. § 119, the content of which is incorporated herein in its entirety by reference.

BACKGROUND

1. Field

The present disclosure relates to a positive electrode for an alkali metal-sulfur battery, an alkali metal-sulfur battery including the same, and a method of preparing the positive electrode.

2. Description of the Related Art

An alkali metal-sulfur battery, specifically an alkali metal-sulfur secondary battery, is proposed as a next generation secondary battery having a high capacity. A lithium ion secondary battery includes a positive electrode active material, e.g., lithium cobalt oxide, that has a theoretical capacity of about 274 mAh/g. However, in reality, due to loss of reversibility upon collapse of a layered structure of the positive electrode active material, a positive electrode active material has a reversible capacity of about 160 mAh/g. In this regard, since a sulfur active material has a very large theoretical capacity of about 1,675 mAh/g, an alkali metal-sulfur secondary battery is considered as a promising next generation secondary battery having high capacity and high energy density.

Unless there remains a need for improved alkali metal-sulfur battery materials.

SUMMARY

Provided is a positive electrode for an alkali metal-sulfur battery that has a sulfur active material that itself has a high capacity Provided is an alkali metal-sulfur battery including the positive electrode.

Provided is a method of preparing a positive electrode for an alkali metal-sulfur battery that has excellent controllability and is capable of introducing a large amount of sulfur into a positive electrode layer in a short time.

Additional aspects will be set forth in part in the description which follows and, in part, will be apparent from the description, or may be learned by practice of the presented exemplary embodiments.

According to an aspect, a positive electrode for an alkali metal-sulfur battery includes: a porous conductive material layer including a plurality of nanocarbon structures of a conductive material, wherein the conductive material defines a plurality of pores between the plurality of nanocarbon structures of the conductive material; sulfur, which is contained in the plurality of pores of the porous conductive material layer; and a polymer film disposed directly on at least a portion of the porous conductive material layer.

According to an aspect, an alkali metal-sulfur battery includes: the positive electrode; a negative electrode including a material capable of incorporating and deincorporating lithium ions; a lithium ion conductive electrolyte disposed between the positive electrode and the negative electrode; and a separator also disposed between the positive electrode and the negative electrode and in the lithium ion conductive electrolyte.

According to an aspect, a method of preparing a positive electrode for an alkali metal-sulfur battery includes: disposing a porous conductive material layer on an upper surface of a current collector, wherein the porous conductive material layer includes a plurality of nanocarbon structures of a conductive material, wherein the conductive material defines a plurality of pores between the plurality of nanocarbon structures of the conductive material; disposing a sulfur-containing polymer film directly on at least a portion of the porous conductive material layer; and introducing the sulfur from the polymer film into the porous conductive material layer to prepare the positive electrode.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
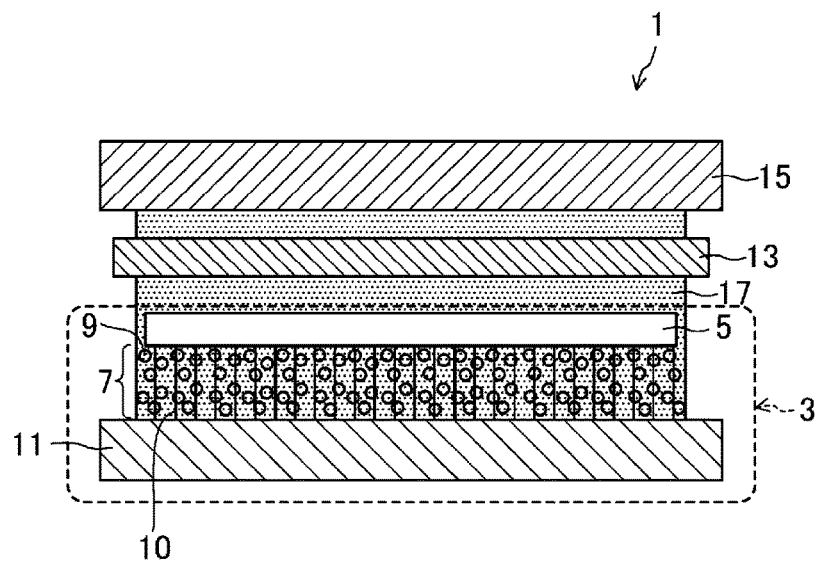
FIG. 1 is a cross-sectional diagram illustrating a schematic configuration of an embodiment of an alkali metal-sulfur secondary battery including an embodiment of a positive electrode.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Sulfur is an insulating material. When sulfur is used as a positive electrode active material, an electrical resistance of the positive electrode increases. The increase in electrical resistance can be accommodated by adding a large amount of a conductive material to a positive electrode layer. However, when a large amount of the conductive material is used, it is difficult to also have a large amount of sulfur in a positive electrode layer of the positive electrode.

In addition, since battery characteristics vary depending on the amount of sulfur in a positive electrode and/or a distribution of sulfur throughout a positive electrode, improved methods to introduce sulfur into a positive electrode are desired.

The terms incorporating and deincorporating are intended to include intercalation and deintercalation, as may occur with an intercalation compound, as well as deposition and stripping, as may occur with a metal electrode.

Alkali Metal-Sulfur Positive Electrode (Positive Electrode Layer) and (Secondary) Battery FIG. 1 is a cross-sectional diagram illustrating a schematic configuration of an embodiment of an alkali metal-sulfur secondary battery including an embodiment of a positive electrode. In FIG. 1, as an example of the alkali metal-sulfur secondary battery, a lithium-sulfur secondary battery 1 is illustrated. In addition, as a matter of convenience, a configuration of a polymer film 5, will be described as being a part of a positive electrode 3 (or a positive electrode layer, which hereinafter will be referred to as "positive electrode").

The positive electrode 3 according to an exemplary embodiment includes: a porous conductive material layer 7 including a conductive material 10 and a plurality of pores formed between the plurality of nanocarbon structure of the conductive material 10; sulfur 9 contained in the plurality of pores of the porous conductive material layer 7; and a polymer film 5 disposed directly on at least a portion of the porous conductive material layer 7. The nanocarbon structure may be a nanocarbon tube, a nanocarbon fiber, and a combination thereof.

The polymer film 5 may be insoluble or slightly soluble in an electrolyte. The polymer film 5 may comprise a sulfur-containing material which is included in a battery and a polymer that is newly produced during charge and discharge and does not have a chemical reaction with a compound, e.g., polysulfide.

The polymer film 5 may be porous, and for example, may be at least one selected from polyethylene oxide (PEO), polyvinyl pyrrolidone (PVP), polyvinyl acetate (PVAc), and polytetrafluoroethylene (PTFE).

Among these examples, when PEO is used to form the polymer film 5, the sulfur 9 contained the polymer film 5 may be easily introduced into the porous conductive material layer 7 with a good workability during the preparation of the positive electrode 3. In addition, although the sulfur 9 may no longer be present in the polymer film 5, the ion conductivity of the polymer film 5 may be not damaged.

The polymer film 5 may comprises a cation exchange resin. A cation exchange resin having sulfone bonds may be as a cation exchange resin, and for example, a cation exchange resin may be Nafion® or the like.

A thickness of the polymer film 5 may be selected as desired, and for example, may be in a range of about 50 micrometers (μm) to about 500 μm, about 60 μm to about 400 μm, or about 70 μm to about 300 μm. When the thickness of the polymer film 5 is much thicker than the range above, the movement of the sulfur 9 from the polymer film 5 to the porous conductive material layer 7 may be difficult.

A weight of the polymer film 5 may be less than 15 weight percent (weight %), based on a total weight of the sulfur 9 contained in, e.g., introduced into, the porous conductive material layer 7 (i.e., a weight of the sulfur 9 contained in the porous conductive material layer 7 in a state before charging and discharging). The term "introduction" used herein refers to "insertion".

When the weight of the polymer film 5 is within the range above, an amount of the sulfur 9 captured and remaining in the polymer film 5 may be reduced by introducing the sulfur 9 from the polymer film 5 into the porous conductive material layer 7.

In addition, after charging and discharging, a part of the sulfur 9 may be dissolved by an electrolyte 17 in the positive electrode 3, but the weight of the polymer film 5 may still be to be less than 15 weight %, based on a total of a weight of the sulfur contained throughout the lithium-sulfur secondary battery 1 in a state after charging and discharging and a weight of sulfur contained in a sulfur-containing compound.

The porous conductive material layer 7 comprises a plurality of nanocarbon structure of the conductive material 10 and comprises a plurality of pores formed between the plurality of nanocarbon structure of the conductive material 10.

The term "porous conductive material layer" used herein refers to a separate and distinct "porous conductive layer," and is distinct from a layer that is additionally disposed on a positive electrode active material layer.

The conductive material 10 may be a material capable of including sulfur 9, and for example, may be porous carbon.

When a carbon nanotube (CNT) is used as the conductive material 10, a density of the sulfur 9 per unit area (1 cm$^2$) of the porous conductive material layer 7 is at least 5 milligrams per square centimeter (mg/cm$^2$) in a state before charging and discharging. When the sulfur 9 has a density of at least 5 mg/cm$^2$, the sulfur 9 may fully exhibit a high capacity thereof. In addition, in the lithium-sulfur secondary battery 1 in a state before charging, when the sulfur 9 is not contained in configuration other than the positive electrode 3, a density of the sulfur 9, based on a total of a weight of sulfur contained throughout the lithium-sulfur secondary battery 1 and a weight of sulfur contained in a sulfur-containing compound per unit area (1 cm$^2$) of the porous conductive material layer 7 is at least 5 mg/cm$^2$, e.g., 5 mg/cm$^2$ to about 100 mg/cm$^2$, or about 10 mg/cm$^2$ to about 80 mg/cm$^2$.

The positive electrode 3 according to an exemplary embodiment may further include a current collector 11 in which the porous conductive material layer 7 is formed on an upper surface of the current collector, wherein the porous conductive material 10 of the porous conductive material layer 7 may include a CNT that has a major axis oriented perpendicular to the upper surface of the current collector 11 (or a planer major surface, which is hereinafter referred to as the "upper surface").

In other words, the positive electrode 3 according to an exemplary embodiment may include: the current collector 11; the porous conductive material layer 7 including the plurality of the conductive materials 10, i.e., CNTs, oriented perpendicular to an upper surface of the current collector 11; the sulfur 9 contained in the pores of the porous conductive material layer 7; and the polymer film 5 disposed directly on at least a part of the porous conductive material layer 7.

Among surfaces of the current collector 11, a surface facing a negative electrode 15 is denoted as "an upper surface" herein.

When a CNT is used as the conductive material 10, a large amount of the sulfur 9 may be contained in the pores formed between CNTs to ensure conductivity of the positive electrode 3. In addition, the perpendicular orientation of the CNTs with respect to the upper surface of the current collector 11 allows direct conduction between the CNTs and the current collector 11, so that the positive electrode 3 may provide improved conductivity.

A positive electrode may be prepared by adding a binder to conductive carbon and the sulfur, but the addition of a binder may cause an increase in an electrical resistance of the positive electrode, and moreover, may disrupt the penetration of ions at an interface.

The positive electrode 3 according to an exemplary embodiment may include the sulfur 9 and the vertically oriented CNTs, and in this regard, the sulfur 9 may be introduced into the pores formed between the CNTs without the addition of a binder. Accordingly, the positive electrode 3 may increase both ionic conductivity and electrical conductivity.

In the configuration described above, when preparing the positive electrode 3 as described later, the sulfur 9 introduced from the polymer film 5 into the porous conductive material layer 7 may be easily inserted into the pores formed between the CNTs.

The current collector 11 may be a metal foil or the like. For example, on a metal foil consisting of nickel (Ni), an aluminum (Al) film may be disposed as a substrate and/or at least one of an iron (Fe) film, a nickel (Ni) film, and a cobalt (Co) film may be sequentially disposed to provide a catalyst layer where the plurality of the conductive materials 10 are grown. The shape of the current collector 11 is not particularly limited, and according to FIG. 1, the current collector 11 has flat upper and bottom surfaces and may be formed as a foil with a predetermined planer shape.

In the porous conductive material layer 7, a density of the conducting material, e.g., the CNTs, may be, for example, in a range of about $1\times10^8$/cm$^2$ to about $1\times10^{12}$/cm$^2$. An average length of the plurality of the CNTs may be, for example, in a range of about 100 μm to about 1,000 μm.

In the configuration described above, the plurality of the CNTs may be arranged in an appropriate interval and length, such that the electrolyte 17 containing lithium ions may easily penetrate into the porous conductive material layer 7. In addition, the sulfur 9 introduced from the polymer film 5 into the porous conductive material layer 7 may be rapidly inserted into the CNTs, and therefore, both ionic conductivity and electrical conductivity of the positive electrode 3 may be retained. In this regard, an increase in the amount of the sulfur active material does not adversely affect an electrochemical oxidation-reduction reaction.

In addition, since the porous conductive material layer 7 including the plurality of the CNTs as the conductive materials 10 has sufficient pores therein, the conductivity of the positive electrode 3 may be retained regardless of the increased amount of the sulfur 9 introduced from the polymer film 5 into the porous conductive material layer 7.

A porosity of the porous conductive material layer 7 (i.e., a volume (%) occupied by spaces in a material) may be at least 60 volume %, based on 100 volume % of a total volume occupied by the porous conductive material layer 7.

When the porosity of the porous conductive material layer 7 is within the range above, the electrical resistance of the positive electrode 3 may not easily increase regardless of the increase amount of the sulfur 9, and thus the positive electrode 3 may not ensure a high capacity thereof.

The porous conductive material layer 7 may further include one of a binder and an additive.

The binder may include, for example, a polymer component, such as PEO, PVP, PVAc, or PTFE.

The additive may include a dispersant and a levelling agent. In addition, when the polymer film 5 includes such a dispersant or a levelling agent, the dispersant or the levelling agent may be also introduced into the porous conductive material layer 7 during a process of introducing the sulfur 9 into the porous conductive material layer 7.

In the lithium-sulfur secondary battery 1, the sulfur 9 in the porous conductive material layer 7 may be a sulfur compound, such as a binary compound, such as $Li_2S$. However, a portion of the sulfur 9 introduced from the polymer film 5 may be in a form of an anion (e.g., $S_x^{2-}$) dissolved in the electrolyte 17.

In addition, the sulfur 9 which is contained in the porous conductive material layer 7 comprises at least a portion of a surface modified with an organic substance. Alternatively, a surface of at least a part of the sulfur 9 included in the pores of the porous conductive material layer 7 may further comprise an organic substance modified on the surface of the sulfur. The organic substance may include, for example, at least one selected from a surface treatment agent, such as a surfactant, a polymer-based pigment, and a silicon polymer.

In this regard, a concentration of the organic substance may be in a range of about 0.1 weight % to about 10 weight %, about 0.2 weight % to about 5 weight %, based on 100 weight % of a total weight of the sulfur 9.

When the sulfur 9 is modified with the organic substance having the weight range within the range above, the dispersibility of the sulfur 9 may be improved in the polymer film 5 and the sulfur 9 may be efficiently inserted into the porous conductive material layer 7 during the preparation of the positive electrode 3.

In another exemplary embodiment of an alkali metal-sulfur secondary battery, the alkali metal-sulfur secondary battery may include the positive electrode 3, a negative electrode 15 (or a negative electrode layer, which hereinafter will be referred to as "negative electrode") including a material capable of incorporating and deincorporating, e.g., intercalating/ deintercalating lithium ions, the lithium ion conductive electrolyte 17 filling a space between the positive electrode 3 and the negative electrode 15, and a separator 13 insulating the space between the positive electrode 3 and the negative electrode 15 in the lithium ion conductive electrolyte 17.

Any suitable material used in a lithium ion battery and a lithium-sulfur secondary battery may be used as the negative electrode 15.

Examples of the material capable of incorporating and deincorporating lithium ions include metals, such as lithium (Li), indium (In), tin (Sn), aluminum (Al), and silicon (Si), alloys thereof; and transition metal oxides, such as $Li_{4/3}Ti_{5/3}O_4$ and SnO; and carbonaceous materials, such as artificial graphite, graphite carbon fibers, resin calcined carbon, thermal decomposition vapor-phase grown carbon, cokes, mesocarbon micro-beads (MCMBs), furfuryl alcohol resin calcined carbon, polyacene, pitch-based carbon fibers, vapor-phase grown carbon fibers, natural graphite, or non-graphitizable carbons. Detailed examples of the material capable of incorporating and deincorporating lithium ions include Li, a Li—Al alloy or a Li—In alloy, Si, SiO, Sn, and $SnO_2$ that are doped with lithium ions, and hard carbon.

The material capable of incorporating and deincorporating lithium ions may be used alone or in a combination of two or more thereof.

The negative electrode 15 may include additives, for example at least one selected from a conducting material, a binding material, a solid electrolyte, a filler, a dispersing agent, and an ion conducting agent, which may be appropriately selected and combined, in addition to the material capable of incorporating and deincorporating lithium ions. In addition, the negative electrode 15 may further include at least one of the binder and the additive included in the positive electrode 3.

As the electrolyte 17, for example, at least one of an ether-based electrolyte, such as tetrahydrofuran, glyme, diglyme, triglyme, and tetraglyme; an ester-based electrolyte, such as diethyl carbonate and propylene carbonate, or a combination of at least one of these examples (e.g., glyme, diglyme, or tetraglyme); and dioxolane used for viscosity adjustment may be used.

Any suitable separator used in a lithium ion battery and a lithium-sulfur secondary battery may be used as the separator 13. For example, the separator 13 may be a porous membrane formed of a synthetic polymer material, such as poly(tetrafluoroethylene), poly(propylene), or poly(ethylene), or a ceramic material. The separator 13 may have a stacked structure including two or more of porous membranes. Among the examples above, a porous membrane formed of polyolefin may prevent a short circuit in a battery and exhibit shutdown effects (i.e., effects of closing pores in the case of an over-temperature condition, e.g., from the flow of excess current), thereby improving the stability of the battery.

As an example of the alkali metal-sulfur secondary battery, the lithium-sulfur secondary battery 1 may include the negative electrode 15 that is formed of lithium metal. In this case, a discharge product generated from the sulfur active material, such as $Li_2S$, during discharging, may cause an oxidation reaction during charging as shown in Reaction 1 below in the positive electrode 3:

$$8Li_2S \rightarrow 16Li^+ + S_8 + 16e^- \qquad (1)$$

In the oxidation reaction, $Li^+$ is released to the electrolyte 17, and moved to the negative electrode 15 through the separator 13. Then, $Li^+$ is oxidized at an interface of the negative electrode 15 as shown in Reaction 2 below, thereby charging the lithium-sulfur secondary battery 1:

$$Li^+ + e^- \rightarrow Li \qquad (2)$$

In addition, the current may be output to the outside of the lithium-sulfur secondary battery 1 during discharging by a reaction occurring in an opposite manner to the reaction during charging.

A density of the sulfur 9, based on a total weight of the sulfur contained throughout the alkali metal-sulfur secondary battery per unit area (1 $cm^2$) of the porous conductive material layer 7 included in the positive electrode 3, may be at least 5 $mg/cm^2$, e.g., about 10 $mg/cm^2$ to about 100 $mg/cm^2$.

Method of Preparing the Positive Electrode 3

In another exemplary embodiment, a method of preparing the positive electrode 3 for the alkali metal alkali metal-sulfur battery includes: disposing, e.g., forming, a porous conductive material layer on an upper surface of a current collector, the porous conductive material layer including a plurality of nanocarbon structure of a conductive material and a plurality of pores formed between the plurality of nanocarbon structure of the conductive material; disposing a sulfur-containing polymer film directly on at least a portion of the porous conductive material layer; and introducing the sulfur from the polymer film into the porous conductive material layer to prepare the positive electrode.

Figure 2:
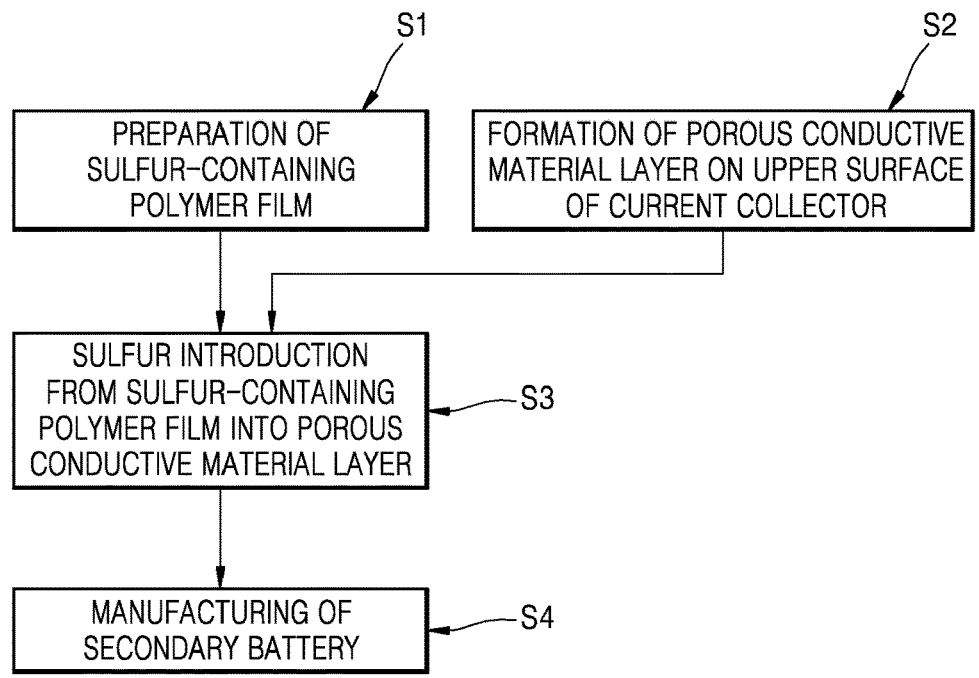
FIG. 2 is a flowchart explaining an embodiment of a method of preparing an embodiment of a positive electrode for an alkali metal-sulfur battery.

FIG. 2 is a flowchart explaining the method of preparing the positive electrode 3 of FIG. 1.

As shown in FIG. 2, the preparation of the positive electrode 3 starts with a process of preparing the polymer film 5 including a simple sulfur substance (e.g., rhombic sulfur $S_8$) (step S1).

First, the simple sulfur substance, a polymer having a predetermined molecular weight, and an organic solvent are mixed and stirred in a container. Then, the mixture was ball-milled to prepare a light yellow slurry.

Next, a polymer sheet or the like is applied with the slurry, and dried. Afterwards, the solvent is removed therefrom, and through exfoliation from the polymer sheet, the sulfur-containing polymer film 5 is formed in a predetermined shape.

The polymer film 5 is a mixed film of sulfur-polymer (sulfur/polymer sheet) including sulfur without having chemical reaction with the polymer, and the mixed film of sulfur polymer has a predetermined thickness.

A weight of the polymer added during the preparation of the slurry is not particularly limited. However, when the weight of the polymer is less than 15%, based on a total weight of the sulfur added during the preparation of the slurry, the sulfur may be introduced from the polymer film 5 into the porous conductive material layer 7 with a good efficiency in the subsequent processes.

The sulfur used herein may be a non-modified simple substance, or may be a simple substance that is modified partially or thoroughly with an organic substance having a weight in a range of about 0.1 weight % to about 10 weigh %, based on 100 weight % of a total weight of the sulfur. When the sulfur modified with the organic substance is used, the dispersibility of the sulfur in the slurry may be improved, and in addition, the polymer film 5 containing the sulfur may be uniformly and easily prepared.

Meanwhile, separately from the preparation of the polymer film 5, the porous conductive material layer 7 is formed on an upper surface of the current collector 11 (step S2).

For example, on an upper surface of the current collector 11 that is formed of metal foil, a substrate having a thickness in a range of about 5 nm to about 500 nm and a catalyst layer having a thickness in a range of about 0.5 nm to about 20 nm may be sequentially formed.

The substrate is configured to improve adhesiveness to the conductive material 10 (e.g., a CNT) and the current collector 11, and may include at least one metal selected from Al, titanium (Ti), vanadium (V), tantalum (Ta), molybdenum (Mo), and tungsten (W), an alloy thereof, or a metal nitride.

The catalyst layer may include, for example, at least one metal selected from Ni, iron (Fe) and cobalt (Co), or an alloy thereof.

Next, the conductive material 10, such as a CNT, is grown on the current collector 11 to a predetermined density through the catalyst layer, using chemical vapor deposition that is a known method in the art, thereby forming the porous conductive material layer 7. In regard to the growing of the CNT, the CNT may be grown to be oriented perpendicular to the upper surface of the current collector 11. Here, the orientation direction of the CNT may not be regular.

Next, the sulfur contained in the polymer film 5 is introduced into the porous conductive material layer 7 (step S3 in FIG. 2).

The polymer film 5 is disposed on the porous conductive material layer 7, compressed, and then, heat treated at a temperature in a range of about 115° C. to about 250° C. at which the sulfur becomes a liquid. The sulfur may be rapidly inserted to the porous conductive material layer 7 at a temperature close to 155° C. at which the sulfur has the lowest viscosity.

According to the heat treatment, the sulfur included in the polymer film 5 is melted, and due to the capillary action, the melted sulfur is inserted to the pores of the porous conductive material layer 7 (see the sulfur 9 of FIG. 1) (step S3).

The step S3 may be performed in the air, under an inert gas atmosphere including nitrogen or argon, or under reduced pressure or vacuum condition. In addition, regarding the introduction of the sulfur from the polymer film 5 into the porous conductive material layer 7, operation of changing the reduced pressure condition into the air condition, or vice versa, may be performed. In the step S3, the polymer film 5 no longer contains the sulfur, and thus a plurality of pores may be formed in the polymer film 5.

Afterwards, the polymer film 5 may be removed from the positive electrode 3, or may remain and is used to prepare the positive electrode 3 of FIG. 1. Even if the polymer film 5 remains in the positive electrode 3, the polymer film 5 hardly influences the performance of the alkali metal-sulfur secondary battery, e.g., the lithium-sulfur secondary battery 1 including the positive electrode 3.

In addition, it is difficult to exfoliate the polymer film 5 from the positive electrode 3 after the sulfur 9 with the small amount of the polymer is introduced into the porous conductive material layer 7. However, if the polymer film 5 remains in the positive electrode 3, there is no need to put effort into the exfoliation, and furthermore, the range of the amount of the polymer in the polymer film 5 may be broaden.

Afterwards, according to the methods known in the art, the positive electrode 3 is used to prepare the lithium-sulfur secondary battery 1 as an example of the alkali metal-sulfur secondary battery (step S4 of FIG. 2).

According to the method of preparing the positive electrode 3, the amount of the sulfur in the polymer film 5 and the ratio of the amount of the sulfur to the amount of the polymer in the polymer may be appropriated adjusted, so that the sulfur may be uniformly inserted to the porous conductive material layer 7 in a short time under good control.

In addition, compared to a method of directly scattering sulfur fine particles to the porous conductive material layer 7 or sublimating the sulfur fine particles, to introduce the sulfur into the porous conductive material layer 7, the method of preparing the positive electrode 3 described in the embodiment above may be performed under excellent controllability and may enable the sulfur 9 to be uniformly introduced into the porous conductive material layer 7.

In addition, since a large amount of the sulfur may be introduced into the porous conductive material layer 7 once through the sulfur introduction process, the lithium-sulfur secondary battery 1 may include the sulfur 9 in the porous conductive material layer 7 in the amount large enough to exhibit a sufficient high capacity of the sulfur, without repeating the sulfur introduction process.

In addition, before introducing sulfur, the amount of the polymer in the polymer film 5 may be, for example, at least 5 weight % based on 100 weight % of the polymer film 5, thereby facilitating the exfoliation of the polymer film 5 after introducing sulfur.

While the positive electrode 3, the method of preparing the positive electrode 3, and the alkali metal-sulfur battery (e.g., the lithium-sulfur secondary battery 1) of the present inventive concept have been particularly shown and described with reference to preferred embodiments thereof, it will be understood by those skilled in the art that various changes in the materials and shapes of each configuration and the preparation methods of slurry may be made therein without departing from the spirit and scope of the inventive concept as defined by the appended claims.

EXAMPLES

In the following examples, positive electrodes for alkali metal-sulfur batteries are each prepared according to Examples 1 to 5 and Comparative Examples 1 to 4, and a lithium-sulfur secondary battery is manufactured according to Example 6. However, the present disclosure is not limited thereto.

Example 1

Carbon nanotubes (CNTs) were grown to an average length of about 350 μm on a metal foil with a thickness of 20 micrometers (μm) according to chemical vapor deposition (CVD), wherein the metal foil was made of Ni and served as a current collector, to form a porous conductive material layer comprised of the grown CNTs. Here, the CNTs were oriented so that the major axis of the CNTs was each perpendicular to an upper surface of the metal foil.

The CNTs forming the porous conductive material layer had a density in a range of about $1 \times 10^{10}/cm^2$ to about $5 \times 10^{10}/cm^2$. Hereinafter, a combination of the metal foil and the porous conductive material layer is referred to as 'a CNT electrode'.

Next, 5.0 g of sulfur modified with 1 weight % of an organic substance (i.e., Sulfax PS available from Tsurumi Chemicals), 0.56 g of PEO having a molecular weight of $3 \times 10^6$ Daltons, and 30 grams (g) of zirconia beads with a diameter of about 2 millimeters (mm) were each weighed, and then, a mixture thereof was placed in a polyethylene container for stirring the mixture. After 20 g of acetonitrile was added to the polyethylene container, the mixture was stirred again and ball-milled at a rotational speed of 90 rpm for 12 hours, thereby obtaining a light yellow, sticky slurry. Here, the sulfur contained in the slurry showed good dispersibility.

Then, the zirconia beads were removed from the slurry through a mesh. The slurry not including the zirconia beads was coated on a polyethylene terephthalate (PET) film applied with a releasing agent, and then the coated PET film was dried, thereby preparing a sulfur-containing polymer film (i.e., a sulfur/polymer sheet). The prepared polymer film had a thickness of about 100 μm and contained sulfur in a density of about 5 mg/cm$^2$.

The prepared polymer film was molded to have a same planar shape as that of the CNT electrode and compressed on the porous conductive layer material, such that the slurry-coated surface of the polymer film was in contact with an upper surface of the porous conductive material layer. Then, by performing a heat treatment on the CNT electrode at a temperature of about 180° C., the sulfur contained in the slurry melted. Then, due to a capillary phenomenon, the sulfur was inserted to pores in the CNT. After completely introducing the sulfur, the polymer film no longer containing the sulfur remained on the porous conductive material layer.

According to the preparation method described in Example 1, almost all amounts of the sulfur contained in the slurry were introduced into the porous conductive material layer once through the sulfur introduction process, thereby shortening the work time.

In addition, it was confirmed by the naked eyes that the external appearance of the positive electrode prepared according to Example 1 has a good shape.

Example 2

A positive electrode for an alkali metal-sulfur battery was prepared in the same manner as in Example 1, except that, in the formation of the slurry, non-modified sulfur (available from Waco Chemicals) was used instead of the sulfur modified with an organic substance.

In comparison with the positive electrode of Example 1, the sulfur was not dispersed in the slurry of Example 2 as much as the sulfur in the slurry of Example 1. However, the external appearance of the positive electrode of Example 2 had a relatively good shape.

In addition, according to the preparation method of Example 2, almost all amounts of the sulfur contained in the slurry were introduced into the porous conductive material layer once through the sulfur introduction process, thereby completing the introduction in a short time to the same extent as in Example 1. It was also confirmed by the naked eyes that the external appearance of the positive electrode prepared according to Example 2 has a good shape.

Example 3

A positive electrode for an alkali metal-sulfur battery was prepared in the same manner as in Example 1, except that the amount of the PEO contained in the polymer film was reduced by half (i.e., 5 weight % based on a weight of the polymer film) before introducing sulfur. Here, the sulfur contained in the slurry of Example 1 showed good dispersibility as much as that in the slurry of Example 1.

In addition, according to the preparation method of Example 3, almost all amounts of the sulfur were possibly introduced from the polymer film into the porous conductive material layer once through the sulfur introduction process, but it was confirmed that a part of the polymer film that was tightly adhered to the porous conductive material layer collapsed after introducing sulfur. It was also confirmed that, after introducing sulfur, a part of the polymer film unevenly remained on a surface of the CNT electrode.

The preparation of the positive electrode of Example 3 may be completed in a short time to the same extent as in Example 1. However, due to the topical collapse of the polymer film, the external appearance of the positive electrode of Example 3 had a relatively unsatisfactory shape compared to that of the positive electrode of Example 1.

Example 4

A positive electrode for an alkali metal-sulfur battery was prepared in the same manner as in Example 1, except that, in the formation of the slurry, non-modified sulfur was used, the amount of the polymer contained in the polymer film was set to 7 weight % before introducing sulfur, and as the polymer served as a binder, PTFE was used instead of the PEO. In the formation of the slurry, non-modified sulfur, PTFE powder, and xylene were mixed in a mortar, and then, rolled under pressure, thereby preparing a polymer film.

The sulfur contained in the polymer film was introduced into the porous conductive material layer in the same manner as in Example 1. Here, the sulfur in the slurry of Example 4 showed good dispersibility, but the dispersibility was not good as that of in the slurry of Example 1.

In addition, it was confirmed that, according to the preparation of the positive electrode of Example 4, although a small amount of the sulfur remained on the polymer film after introducing sulfur, almost all amounts of the sulfur contained in the slurry were possibly introduced from the polymer film into the porous conductive material layer once through the sulfur introduction process. It was also confirmed that the preparation of the positive electrode of Example 4 was able to be completed in a short time to the same extent as in Example 1, and that the external appearance of the positive electrode of Example 4 has a good shape as much as that of the positive electrode of Example 1.

Example 5

A positive electrode for an alkali metal-sulfur battery was prepared in the same manner as in Example 1, except that, the amount of the PEO contained in the polymer film was set to 30 weight % before introducing sulfur.

Here, the sulfur showed good dispersibility in the slurry of Example 5 as much as that in the slurry of Example 1. In addition, it was confirmed that a small amount of the sulfur was able to be introduced from the polymer film into the porous conductive material layer once through the sulfur introduction process. However, the amount of the sulfur to be introduced into the porous conductive material layer was less than that of the sulfur in Examples 1 and 2.

Comparative Example 1

In Comparative Example 1, a surface of the CNT electrode was scattered with sieved non-modified sulfur. Then, by performing a heat treatment on the CNT electrode, the sulfur was introduced into the CNT. However, the maximum amount of the sulfur available once through the sulfur introduction process was only about 2 $mg/cm^2$ per unit area of the porous conductive material layer. Thus, to introduce 5 $mg/cm^2$ of the sulfur, it is necessary to repeat the sulfur introduction process at least 3 times. In this regard, it was very difficult to control the amounts of the residual sulfur to be introduced. The external appearance of the positive electrode prepared in Comparative Example 1 had a good shape.

Comparative Example 2

In Comparative Example 2, a carbon disulfide solution containing 8 weight % of sulfur was prepared. Next, a CNT electrode was immersed in the solution, and then, dried, thereby preparing a positive electrode. In the preparation of the positive electrode, the CNT was frequently exfoliated from the metal foil. A plurality of the positive electrodes were prepared, but only a few of them were available for usage. In addition, due to the exfoliation of the CNT, the introduction of sulfur was carried out only once. In addition, it was confirmed that the amounts of the sulfur available for the introduction into the porous conductive material layer was smaller than that of the sulfur of Examples 1 to 5.

Comparative Example 3

In Comparative Example 3, sulfur was heat-sublimated in an airtight container, and the sublimated sulfur was in contact with a CNT electrode. Afterwards, the CNT electrode was cooled to allow the introduction of sulfur thereto. However, to increase the amount of the sulfur available for an introduction up to 5 $mg/cm^2$, the sulfur introduction process had to be carried out at least 10 times, requiring a longer time. In addition, it is very difficult to control the amounts of the residual sulfur to be introduced.

Comparative Example 4

In Comparative Example 4, an attempt to pressurize and mold sulfur into pellets was made, and as a result, it was confirmed that the sulfur was suitable for the molding, but had very poor brittleness. When the sulfur pellets were able to be introduced into the CNT electrode, the introduction of sulfur was allowed only once. Alternatively, the sulfur pellets were not able to be introduced into the CNT electrode, due to the collapse of the pellets. Thus, it cannot be determined whether the introduction of sulfur was made for the better or the worse.

Evaluation Criteria of the Preparation Methods of the Positive Electrodes, and Evaluation Results Thereof The results of evaluating the preparation methods of positive electrodes of Examples 1 to 5 and Comparative Examples 1 to 4 are shown in Table 1 below.

TABLE 1

| | Sulfur | Polymer | Amount (weight %) | Number of sulfur introduction | Workability | Introduction of sulfur | Dispersibility | External appearance of positive electrode | Overall evaluation |
|---|---|---|---|---|---|---|---|---|---|
| Example 1 | modified | PEO | 10 | ○ | ○ | ○ | ○ | ○ | ◎ |
| Example 2 | non-modified | PEO | 10 | ○ | ○ | ○ | Δ | ○ | ○ |
| Example 3 | modified | PEO | 5 | ○ | ○ | Δ | ○ | Δ | ○ |
| Example 4 | non-modified | PTFE | 7 | ○ | ○ | Δ | Δ | ○ | ○ |
| Example 5 | modified | PEO | 30 | ○ | ○ | Δ | ○ | ○ | ○ |
| Comparative Example 1 | non-modified | None | — | X | Δ | — | — | ○ | X |
| Comparative Example 2 | non-modified | None | — | X | ○ | X | — | X | X |
| Comparative Example 3 | non-modified | None | — | X | X | X | — | ○ | X |
| Comparative Example 4 | non-modified | None | — | — | X | — | — | — | X |

Referring to Table 1, ⊚ represents 'excellent', ○ represents 'good', Δ represents 'available', and x represents 'not available'.

The item 'Amount' used in Table 1 refers to the amount (by weight %) of the polymer included in the polymer film in a dried state before introducing sulfur. Items other than 'Amount' and evaluation criteria thereof are as follows.

Number of sulfur introduction: The number of sulfur introduction required to introduce a predetermined amount of sulfur was evaluated. If the sulfur is not able to be repeatedly introduced, the number of sulfur introduction is set to once. A case where the sulfur introduction was performed only once was evaluated as 'o (good)', a case where the sulfur introduction was performed twice was evaluated as 'Δ (available)', and a case where the sulfur introduction is performed three or more times was evaluated as 'x (unavailable)'. In addition, a case where the sulfur introduction was not even allowed once or a case where even a small amount (5 mg/cm²) of sulfur was not able to be introduced (as in Comparative Example 2) was evaluated as 'x (unavailable)'.

Workability: The workability of the preparation methods was evaluated in terms of less number of sulfur introduction and shorter work time based on Example 1. In detail, a case where the sulfur introduction was performed in 30 minutes was evaluated as 'o (good)', a case where the sulfur introduction was performed for longer than 30 minutes and equal to or less than 60 minutes was evaluated as 'Δ (available)' and a case where the sulfur introduction was performed for longer than 60 minutes was evaluated as 'x (unavailable)'.

Introduction of sulfur: The introduction of sulfur was determined based on the amount of the sulfur available to be introduced into the porous conductive material layer. After introducing sulfur, a case where the polymer film or traces of the introduction of sulfur remained on an entire surface of the CNT electrode was evaluated as 'o (good)', a case where the polymer film or traces of the introduction of sulfur partially remained on a surface of the CNT electrode was evaluated as 'Δ (available)' and a case where the polymer film or traces of the introduction of sulfur unevenly remained on a surface of the CNT electrode was evaluated as 'x (unavailable)'.

Dispersibility: The dispersibility of sulfur in the slurry was observed by the naked eyes for evaluation. A case where sulfur was evenly dispersed in the slurry was evaluated as 'o (good)'. Meanwhile, a case where a polymer film was prepared without difficulty even though sulfur was not dispersed well in the slurry and some agglomerates were found in the slurry was evaluated as 'Δ (available)', and a case where sulfur was dispersed badly in the slurry, and thus a polymer film was prepared with difficulty was evaluated as 'x (unavailable)'.

External appearance of positive electrode: The external appearance of the positive electrode available for usage was observed by the naked eyes for evaluation. A case where a polymer film was used and remained on the CNT electrode to almost cover an entire surface of the CNT electrode was evaluated as 'o (good)'. If a polymer film was not used, the external appearance of the positive electrode was determined based on whether traces of the introduction of sulfur remained on almost an entire surface of the CNT electrode or partially remained on the surface of the CNT electrode. A case where the external appearance of the positive electrode was well shaped was evaluated as 'o (good)', a case where the external appearance of the positive electrode had problems with the collapse of the polymer film in some portions of the surface of the CNT electrode, but was good enough to be used in the positive electrode was evaluated as 'Δ (available)', and a case where the external appearance of the positive electrode had problems with the exfoliation of the CNT and was not able to be used in the positive electrode was evaluated as 'x (unavailable)'.

Overall evaluation: When the overall items for evaluating the respective prepared positive electrode were evaluated as 'o (good)', the positive electrode was determined as '⊚ (excellent)'. When two or less of the items for evaluating the respective prepared positive electrode were evaluated as 'Δ (available)' and the remaining items were evaluated as 'o (good)', the positive electrode was determined as 'o (available)'. When even a single item for evaluating the respective prepared positive electrode was evaluated as 'x (unavailable)' or three or more of the items were evaluated as 'Δ (good)', the positive electrode was determined as 'x (unavailable)'.

Referring to Table 1, it was confirmed that the overall evaluation of the positive electrodes prepared according to Examples 1 to 5 was at least 'o (good)' overall, and that the positive electrodes of Examples 1 to 5 had satisfactory workability and contained sulfur in an amount sufficient enough to be introduced into the porous conductive material layer.

Meanwhile, in the case of using sulfur to scatter the CNT electrode, using carbon disulfide as a solvent, or treating sulfur according to the heat sublimation, the sulfur was not able to be introduced into the porous conductive material layer in a sufficient amount. In addition, it was confirmed that, in comparison with the positive electrodes prepared according to the preparation methods of Comparative Examples 1, 3, and 4, the positive electrodes prepared according to the preparation methods of Examples 1 to 5 had satisfactory workability.

Evaluation of Lithium-Sulfur Secondary Battery

Example 6

A lithium-sulfur secondary battery including a positive electrode prepared according to the preparation method of Example 1 was manufactured. Here, a planar shape of the positive electrode was configured into a circle with a diameter of 14 mm, and the amount of sulfur to be introduced per unit area of the porous conductive material layer was set to 8.7 mg/cm².

A Li—Al alloy foil (20 volume % of Al) with a diameter of 15 mm and a thickness of 400 μm was used as a negative electrode, and Celgard #2400 (available from Celgard Company) was used as a separator. In addition, 100 μL of a mixed solution of 1M LiTFSI (1,2-dimethoxy ethane (DME)/1,3-dioxolane (DOL)=90 volume %/10 volume %) and 3 weight % of $LiNO_3$ was used as an electrolyte. These constituent materials were used according to the known method in the art, thereby manufacturing a CR2032-type coin battery. The characteristics of the manufactured lithium-sulfur secondary battery were then evaluated.

During the evaluation, the lithium-sulfur secondary battery was charged and discharged with a constant current of 0.77 mA (0.50 mA/cm²) and cut off at a voltage of 1.5 V (during discharging) and 2.8 V (during charging).

Figure 3:
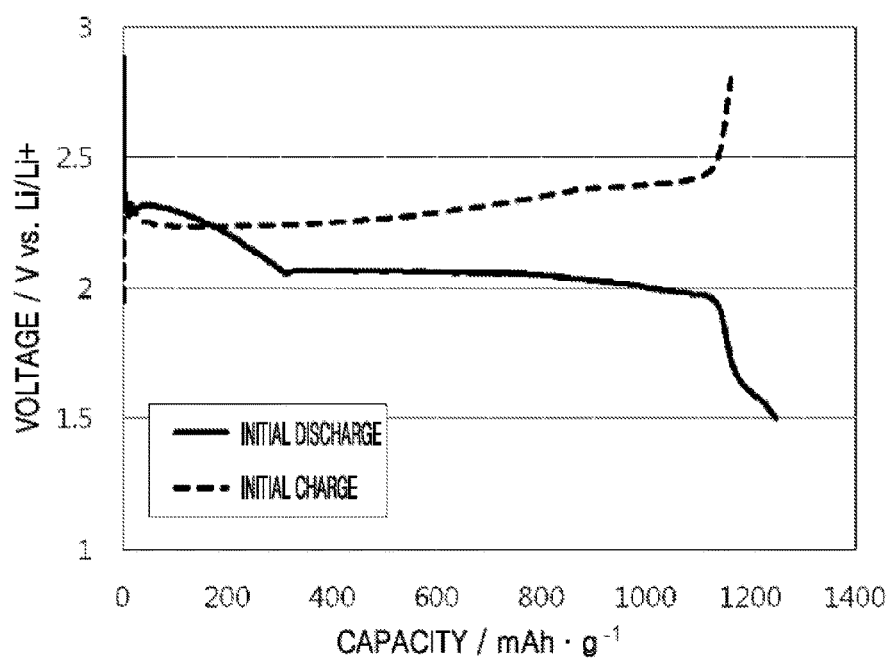
FIG. 3 is a graph of voltage (volts versus Li/Li$^+$) versus capacity (milliampere hours per gram, mAh·g$^{-1}$) showing a charge/discharge profile of a lithium-sulfur secondary battery prepared in Example 6.

FIG. 3 is a graph showing a charge/discharge profile of the lithium-sulfur secondary battery prepared in Example 6. Here, the vertical axis represents the measured voltage and the horizontal axis represents the ratio capacity.

Referring to FIG. 3, it was confirmed that, when the positive electrode of Example 6 is used, a satisfactory charging and discharging cycle may be carried out with a high electric capacity exceeding 1,100 mAh/g per weight of sulfur.

As described above, the positive electrode for the alkali metal-sulfur battery and the method of preparing the same as disclosed in the present inventive concept may be applied to the alkali metal-sulfur battery, such as the lithium-sulfur (secondary) battery.

As described above, according to the one or more of the above exemplary embodiments, provided are a positive electrode for an alkali metal-sulfur battery that has a sulfur active material that has a high capacity in nature and a battery including the positive electrode. In addition, provided is a method of preparing the positive electrode that has excellent controllability and is capable of introducing a large amount of sulfur into a positive electrode layer in a short time.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A positive electrode for an alkali metal-sulfur battery, the positive electrode comprising:
a porous conductive material layer comprising,
a plurality of nanocarbon structures of a conductive material, and
a plurality of pores between the plurality of nanocarbon structures of the conductive material;
sulfur, which is contained throughout each of the plurality of pores between the plurality of nanocarbon structures of the conductive material; and
a polymer film disposed directly on at least a portion of the porous conductive material layer.

2. The positive electrode of claim 1, wherein the porous conductive material layer further comprises at least one of a binder and an additive.

3. The positive electrode of claim 1, wherein the polymer film is porous, and wherein the polymer film comprises at least one selected from polyethylene oxide, polyvinyl pyrrolidone, polyvinyl acetate, and polytetrafluoroethylene.

4. The positive electrode of claim 1, wherein the polymer film is porous and comprises a cation exchange resin.

5. The positive electrode of claim 1, wherein a thickness of the polymer film is from about 50 micrometers to about 500 micrometers.

6. The positive e of claim 1, wherein a weight of the polymer film is less than 15 weight percent, based on a total weight of the sulfur contained in the porous conductive material layer.

7. The positive electrode of claim 1, wherein a density of the sulfur per unit area of the porous conductive material layer is at least 5 milligrams per square centimeter.

8. The positive electrode of claim 1, wherein the sulfur which is contained in the porous conductive material layer comprises at least a portion of a surface modified with an organic substance.

9. The positive electrode of claim 8, wherein a concentration of the organic substance is from about 0.1 weight percent to about 10 weight percent, based on 100 weight percent of a total weight of the sulfur.

10. The positive electrode of claim 1, further comprising a current collector disposed on a surface of the porous conductive material layer which is opposite a surface of the porous conductive material layer on which the polymer film is disposed,
wherein the porous conductive material of the porous conductive material layer comprises carbon nanotubes that are oriented to have a length perpendicular to a surface of the current collector, on which the porous conductive material layer is disposed.

11. The positive electrode of claim 10, wherein a density of the carbon nanotubes of the porous conductive material is from about $1 \times 10^8$ per square centimeter to about $1 \times 10^{12}$ per square centimeter.

12. The positive electrode of claim 10, wherein an average length of the carbon nanotubes of the porous conductive material layer is from about 100 micrometers to about 1,000 micrometers.

13. The positive electrode of claim 10, wherein a porosity of the porous conductive material layer is at least 60 volume percent, based on 100 volume percent of a total volume occupied by the porous conductive material layer.

14. An alkali metal-sulfur battery comprising:
the positive electrode of claim 1;
a negative electrode comprising a material capable of incorporating and deincorporating lithium ions;
a lithium ion conductive electrolyte disposed between the positive electrode and the negative electrode; and
a separator also disposed between the positive electrode and the negative electrode and in the lithium ion conductive electrolyte.

15. The battery of claim 14, wherein a total weight of the sulfur contained in the alkali metal-sulfur battery per unit area of the porous conductive material layer, which is comprised in the positive electrode, is at least 5 milligrams per square centimeter.

16. A method of preparing a positive electrode for an alkali metal-sulfur battery, the method comprising:
disposing a porous conductive material layer on an upper surface of a current collector, wherein the porous conductive material layer comprises a plurality of nanocarbon structures of a conductive material, wherein the conductive material defines a plurality of pores between the plurality of nanocarbon structures of the conductive material;
disposing a sulfur-containing polymer film directly on at least a portion of the porous conductive material layer; and
introducing the sulfur from the polymer film into the porous conductive material layer to prepare the positive electrode,
wherein the sulfur introduced from the polymer film is contained throughout each of the plurality of pores between the plurality of nanocarbon structures of the conductive material.

17. The method of claim 16, wherein, in the disposing of the sulfur-containing polymer film directly on at least a portion of the porous conductive material layer, a content by weight of the polymer in the polymer film is at least 5 weight percent, based on 100 weight percent of a total content by weight of the polymer film.

18. The method of claim 16, wherein, the introducing of the sulfur from the polymer film into the porous conductive material layer comprises:

heat treating the polymer film at a temperature from about 115° C. to about 250° C. to melt the sulfur; and
introducing the melted sulfur into the pores of the porous conductive material layer.

* * * * *